US011077408B2

(12) United States Patent
Lim et al.

(10) Patent No.: US 11,077,408 B2
(45) Date of Patent: Aug. 3, 2021

(54) SELECTIVE EXTRACTION FILM FOR MINING APPLICATION

(71) Applicant: BASF SE, Ludwigshafen am Rhein (DE)

(72) Inventors: Yoke Lim Lim, Singapore (SG); Natalia Widjojo, Singapore (SG); Richard Grant Macoun, Waterford (AU); Natalia Emeliyanova, Ludwigshafen (DE); Ulf Baus, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/470,433

(22) PCT Filed: Dec. 21, 2017

(86) PCT No.: PCT/EP2017/084063
§ 371 (c)(1),
(2) Date: Jun. 17, 2019

(87) PCT Pub. No.: WO2018/115268
PCT Pub. Date: Jun. 28, 2018

(65) Prior Publication Data
US 2020/0108356 A1    Apr. 9, 2020

(30) Foreign Application Priority Data

Dec. 23, 2016  (SG) .......................... 10201610826W
Feb. 24, 2017  (EP) ..................................... 17157793

(51) Int. Cl.
*B01D 71/30*    (2006.01)
*C22B 3/22*     (2006.01)
*B01D 61/20*    (2006.01)
*B01D 71/40*    (2006.01)
*C22B 3/00*     (2006.01)

(52) U.S. Cl.
CPC ............. *B01D 71/30* (2013.01); *B01D 61/20* (2013.01); *B01D 71/40* (2013.01); *C22B 3/22* (2013.01); *C22B 23/0453* (2013.01); *B01D 2311/12* (2013.01)

(58) Field of Classification Search
CPC ............... B01D 71/30; B01D 2311/12; B01D 67/0009; B01D 67/0011; B01D 69/06; B01D 2323/12; B01D 2323/20; B01D 2323/06; B01D 2311/18; B01D 2315/08; B01D 61/20; B01D 61/38; B01D 71/10; B01D 71/12; B01D 71/16; B01D 71/18; B01D 71/26; B01D 71/28; B01D 71/40; B01D 71/42; B01D 71/58; B01D 71/68; B01D 71/82; B01D 67/0088; B01D 2323/26; C22B 23/0453; C22B 3/22; C22B 3/20; C22B 23/20; C22B 23/22; C22B 3/04; C22B 3/0407; C22B 3/0446; C22B 3/0453; C22B 3/0476; C22B 3/0492; Y02P 10/234; C02F 2103/06; C02F 2103/10; C02F 2103/16; C02F 1/26; C02F 1/44; C02F 1/444; C02F 1/62; C02F 2101/10; C02F 2101/22
USPC .... 210/644, 500.21, 500.27–500.32, 500.34, 210/500.35, 500.41, 500.42, 500.43, 651; 423/24, 27, 32, 139, 150.1
See application file for complete search history.

(56) References Cited

U.S. PATENT DOCUMENTS

| 2,902,345 | A | * | 9/1959 | Hyde ................... C22B 3/0029 423/139 |
| 3,069,231 | A | * | 12/1962 | Hard .................... C22B 3/0029 423/139 |
| 3,423,491 | A | * | 1/1969 | Mahon ...................... D01F 1/10 264/49 |
| 4,008,308 | A | * | 2/1977 | Sullivan .................... C01C 3/20 423/139 |
| 4,256,227 | A | * | 3/1981 | Petrovich ............... B03D 1/012 209/166 |
| 4,876,287 | A | * | 10/1989 | Babcock ................ C25D 21/18 521/28 |
| 5,114,579 | A | * | 5/1992 | Takigawa ............... B01D 61/38 210/321.76 |
| 5,868,935 | A | * | 2/1999 | Sirkar .................. B01D 17/085 210/321.8 |
| 6,086,769 | A | * | 7/2000 | Kilambi ............... B01D 61/246 210/638 |
| 8,829,061 | B2 | | 9/2014 | Kolev et al. |
| 2002/0060162 | A1 | * | 5/2002 | Kocherginsky ..... C22B 15/0086 205/560 |

(Continued)

FOREIGN PATENT DOCUMENTS

CN          101053792 A      10/2007

OTHER PUBLICATIONS

Recep Ali Kumbasar, "Selective extraction of cobalt from strong acidic solutions containing cobalt and nickel through emulsion liquid membrane using TIOA as carrier", Journal of Industrial and Engineering Chemistry, Published Jun. 2012, vol. 18, pp. 2076-2082. (Year: 2012).*

(Continued)

*Primary Examiner* — Joseph W Drodge
(74) *Attorney, Agent, or Firm* — Grüneberg and Myers PLLC

(57) ABSTRACT

The present invention is related to a polymer membrane for the selective extraction of cobalt (II) ions as well as a method for extracting cobalt (II) ions using said polymer membrane.

15 Claims, No Drawings

(56) References Cited

U.S. PATENT DOCUMENTS

| | | | | |
|---|---|---|---|---|
| 2010/0006495 | A1* | 1/2010 | Buschmann | B01D 69/10 210/500.25 |
| 2012/0312126 | A1* | 12/2012 | Yamaguchi | C22B 26/12 75/743 |
| 2013/0324625 | A1* | 12/2013 | Kolev | B01D 71/30 521/27 |
| 2019/0099724 | A1 | 4/2019 | Bos | |
| 2019/0209973 | A1 | 7/2019 | Widjojo et al. | |
| 2019/0358593 | A1 | 11/2019 | Staudt et al. | |
| 2020/0108356 | A1 | 4/2020 | Lim et al. | |

OTHER PUBLICATIONS

International Search Report dated Apr. 30, 2018 in PCT/EP2017/084063, filed Dec. 21, 2017.

Written Opinion dated Apr. 30, 2018 in PCT/EP2017/084063, dated Dec. 21, 2017.

Extended European Search Report dated Sep. 11, 2017 in Patent Application No. 17157793.5, filed Feb. 24, 2017, 16 Pages.

Yasemin Yildiz, et al., "Selective extraction of cobalt ions through polymer inclusion membrane containing Aliquat 336 as a carrier," Desalination and Water Treatment, vol. 57, No. 10, XP008185789, Feb. 2016, 9 Pages.

Aynur Manzak, et al., "Characterization of polymer inclusion membrane containing Aliquat 336 as a carrier," Membrane Water Treatment, vol. 6, No. 2, XP055402505, 2015, 9 Pages.

Yasemin Yildiz, et al., "Synergistic extraction of cobalt and nickel ions by supported liquid membranes with a mixture of TIOA and TBP," Desalination and Water Treatment, vol. 53, No. 5, XP008185790, Feb. 2015, 9 Pages.

Aynur Manzak, et al., "Characterization of polymer inclusion membrane containing Aliquat 336 as a carrier," The 2014 World Congress on Advances in Civil, Environmental, and Materials Research (ACEM14), XP055402506, Aug. 2014, 8 pages.

Office Action dated May 8, 2021 in Chinese Application No. 201780078613.9.

* cited by examiner

SELECTIVE EXTRACTION FILM FOR MINING APPLICATION

FIELD OF THE INVENTION

The present invention is related to a polymer membrane, in particular a polymer inclusion membrane (PIM) for the selective extraction of cobalt (II) ions as well as a method for extracting cobalt (II) ions using said polymer membrane.

BACKGROUND OF THE INVENTION

The transition metal cobalt is commonly used in special alloys, steels and catalysts and is, therefore, an important resource for industry and research. For most applications, the use of highly purified cobalt compounds is of high importance. However, cobalt is usually obtained by reducing the cobalt by-products of nickel and copper mining and smelting whereupon the raw material is often accompanied by said metals. Therefore, it is required to separate cobalt from nickel and copper in order to obtain highly pure cobalt compounds.

In this regard, the application of polymer membranes containing selective extractants and complexing agents is well known in the art. Such polymer membranes usually contain a base polymer to provide mechanical strength, an extractant acting as a carrier of ions through the membrane and a plasticizer for elasticity. Commonly used polymer membranes are for instance supported liquid membranes (SLMs) and polymer inclusion membranes (PIMs) wherein the latter are particularly advantageous since it is not required to re-impregnate the membrane after use. SLMs have to be re-impregnated and, therefore, cannot be reused whereupon the application of SLMs in industrial processes is not attractive.

For the separation of cobalt and nickel, Yildiz et al. (Destillation and Water Treatment 2016, 57, 4616-4623) have found that a good selectivity is achieved with a cellulose triacetate (CTA) membrane comprising 25 wt.-% of the plasticizer 2-nitrophenyl pentylether (NPPE), 25 wt.-% of the modifier tributyl phosphate (TBP) and 25 wt.-% of the extractant trioctylmethylammonium chloride (Aliquat 336®).

However, with regard to the effectivity and feasibility of the separation process, it is also desired that the metal ions pass the membrane with a rather high flux. Focusing on cobalt as target metal, polymer membranes currently applied for the extraction of cobalt (II) ions exhibit drawbacks regarding the flux of the cobalt (II) ions through the membrane. In the context of a commercial application, it is obvious that the flux should be as high as possible.

Accordingly, there is a need in the art for a polymer membrane applicable for separating cobalt from nickel with an increased flux while the selectivity remains on a high level.

Therefore, it is an object of the present invention to provide a polymer membrane which separates cobalt from nickel at a high cobalt flux.

SUMMARY OF THE INVENTION

The foregoing and other objects are solved by the subject-matter of the present invention.

According to a first aspect of the present invention, a polymer membrane, comprising
i) about 5.0 to about 33.0 wt.-% of a base polymer (B),
ii) optionally at least about 18 wt.-% of a plasticizer (P),
iii) at least about 22 wt.-% of an extractant (E), and
iv) at least about 26 wt.-% of a modifier (M),
based on the overall weight of the polymer membrane, respectively, is provided.

The inventors surprisingly found out that the application of a polymer membrane comprising about 5.0 to about 33.0 wt.-% of a base polymer (B), optionally at least about 18 wt.-% of a plasticizer (P), and at least about 22 wt.-% of an extractant (E) for the separation of cobalt from nickel results in an increased cobalt flux without compromising the selectivity between cobalt and nickel.

According to a further aspect of the present invention, the polymer membrane contains the base polymer (B) and the extractant (E) in a weight ratio w(B)/w(E) below 1.3, wherein w(B) is the overall amount of the base polymer (B) in wt.-% and w(E) is the overall amount of the extractant (E) in wt.-%, based on the overall weight of the polymer membrane, respectively.

It is especially preferred that the ratio w(B)/w(E) is in the range of about 0.1 to about 0.7.

According to a further aspect of the present invention, the base polymer (B) is selected from the group consisting of cellulose, cellulose acetate, cellulose triacetate, polyvinylchloride (PVC), polyethylene, polypropylene, polystyrene, polyacrylnitrile, polymethylacrylate, polymethylmethacrylate, polybutadiene, polyisoprene, polyethersulfone, polysulfone or mixtures thereof.

It is especially preferred that the base polymer (B) is polyvinylchloride (PVC).

According to one aspect of the present invention, the extractant (E) is selected from a tertiary amine or a quaternary ammonium compound.

According to another aspect of the present invention, the modifier (M) is selected from an aromatic or aliphatic ester of phosphoric acid.

According to still another aspect of the present invention, the weight ratio w(B)/w(E) as defined above is in the range of about 0.1 to about 0.7 and the base polymer (B) is polyvinylchloride.

According to a further aspect of the present invention, the weight ratio w(B)/w(E) as defined above is in the range of about 0.1 to about 0.7 and the extractant (E) is selected from a tertiary amine or a quaternary ammonium compound.

According to one aspect of the present invention, the weight ratio w(B)/w(E) as defined above is in the range of about 0.1 to about 0.7 and the modifier (M) is selected from an aromatic or aliphatic ester of phosphoric acid.

According to another aspect of the present invention, the weight ratio w(B)/w(E) as defined above is in the range of about 0.1 to about 0.7, the extractant (E) is selected from a tertiary amine or a quaternary ammonium compound, and the modifier (M) is selected from an aromatic or aliphatic ester of phosphoric acid.

According to one aspect of the present invention, the base polymer (B) is polyvinylchloride (PVC), the extractant (E) is selected from a tertiary amine or a quaternary ammonium compound, and the modifier (M) is selected from an aromatic or aliphatic ester of phosphoric acid.

It is especially preferred that the base polymer (B) is polyvinylchloride (PVC), the weight ratio w(B)/w(E) as defined above is in the range of about 0.1 to about 0.7, the extractant (E) is selected from a tertiary amine or a quaternary ammonium compound and the modifier (M) is selected from an aromatic or aliphatic ester of phosphoric acid.

According to another aspect of the present invention, the plasticizer (P) is selected from the group consisting of 2-nitro-phenyl octyl ether (2-NPOE), 2-nitro-phenyl pentyl ether (2-NPPE), diisononyl phthalate (DINP), diisodecyl phthalate (DIDP), di-2-ethylhexyl phthalate (DEHP), 1,2-cyclohexanedicarbonicacid-diisononylester (Hexamoll® Dinch®) and mixtures thereof.

According to a still another aspect of the present invention, the extractant (E) is selected from the group consisting of trioctylmethylammonium chloride (Aliquat 336), tetra-n-butylammonium bromide tetramethylammonium chloride, dimethyldioctadecylammonium chloride, N,N-dioctyl-1-octanamine (Alamine 336), Tri-n-octylamine (Alamine 308) or mixtures thereof.

According to one aspect of the present invention, the modifier (M) is selected from the group consisting of triphenylphosphat, tri-n-butylphosphat, tri-sec-butylphosphat, tri-tert-butylphosphat, triethylphosphat, trimethylphosphat, tri-n-propylphosphat, triisopropylphosphat, tri-n-hexylphosphat and mixtures thereof.

According to another aspect of the present invention, the polymer membrane contains the extractant (E) and the plasticizer (P) in a weight ratio w(E)/w(P) below 1.6, wherein w(E) is the overall amount of the extractant (E) in wt.-% and w(P) is the overall amount of the plasticizer (P) in wt.-%, based on the overall weight of the polymer membrane, respectively.

According to a second aspect of the present invention, a method for separating cobalt from other metals is provided, comprising the steps of
a) providing a container comprising a first chamber and a second chamber separated by a polymer membrane as described above,
b) feeding a composition comprising cobalt and/or at least one salt thereof and at least one further metal other than cobalt and/or at least one salt of a further metal other than cobalt into the first chamber,
c) adding thiocyanic acid and/or a salt thereof to the composition of step b) in the first chamber,
d) optionally adding a pH-buffer to the composition obtained in step c) in the first chamber, and
e) feeding a stripping solution (S) into the second chamber.

According to a further aspect of the present invention, the stripping solution (S) comprises ammonia ($NH_3$) and triethanolamine (TEA) in a molar ratio in the range of 2:1 to 1:2.

It is especially preferred that ammonium thiocyanate ($NH_4SCN$) is applied in step c).

According to another aspect of the present invention, the pH-buffer comprises acetic acid and ammonium acetate and/or the pH value of the composition obtained in step d) is in the range of 2 to 6.

According to a still another aspect of the present invention, the cobalt salt is selected from cobalt (II) chloride ($CoCl_2$), cobalt (II) bromide ($CoBr_2$), cobalt (II) iodide ($CoI_2$), cobalt (II) fluoride ($CoF_2$), cobalt (II) sulfate ($CoSO_4$), cobalt (II) sulfite ($CoSO_3$), cobalt (II) nitrate ($Co(NO_3)_2$) and mixtures thereof.

It is especially preferred that the at least one salt of a further metal other than cobalt is selected from nickel (II) chloride ($NiCl_2$), nickel (II) bromide ($NiBr_2$), nickel (II) iodide ($NiI_2$), nickel (II) fluoride ($NiF_2$), nickel (II) sulfate ($NiSO_4$), nickel (II) sulfite ($NiSO_3$), nickel (II) nitrate ($Ni(NO_3)_2$) and mixtures thereof.

The present invention is further directed to the use of a polymer membrane as described above as a selective extraction film for the extraction of cobalt and/or a salt thereof from a composition comprising cobalt and/or a salt thereof and at least one further metal other than cobalt and/or at least one salt of a further metal other than cobalt.

According to one embodiment of the present invention, the composition is an aqueous composition, such as an aqueous composition containing a mixture of metals and/or metal salts.

According to another embodiment of the present invention, the composition is an ore, a leach solution or a waste composition.

In another embodiment, the method for separating the cobalt or cobalt salt is applied in mining and/or waste recycling industry.

It is especially preferred that the at least one further metal other than cobalt and/or at least one salt of a further metal other than cobalt is nickel and/or a salt thereof.

In the following, the present invention is described in more detail.

DETAILED DESCRIPTION OF THE INVENTION

A polymer membrane, comprising
i) about 5.0 to 33.0 wt.-% of a base polymer (B),
ii) optionally at least about 18 wt.-% of a plasticizer (P),
iii) at least about 22 wt.-% of an extractant (E), and
iv) at least about 26 wt.-% of a modifier (M),
based on the overall weight of the polymer membrane, respectively, is provided.

It was surprisingly found out by the inventors that for the separation of cobalt and nickel, a perfect selectivity towards cobalt at an increased cobalt flux is achieved with a polymer membrane comprising a base polymer, optionally a plasticizer, an extractant and a modifier in amounts as indicated above.

As used herein, the term "polymer membrane" is related to a film comprising a polymeric material which is permeable for ionic metal compounds. In one embodiment, the "polymer membrane" is a "polymer inclusion membrane".

As used herein, the term "plasticizer" is related to an additive, preferably an additive featured by a rather high dielectric constant (e.g. $\in$ is more than 15, more than 20, or more than 22), which increases the viscosity of a material, especially a polymeric material.

As used herein, the term "extractant" is related to a substance used for extracting one or more compounds from a mixture containing said compounds. The selection of the extractant depends on the solubility of the compound to be extracted. Thus, for the extraction of a specific compound, an extractant of similar polarity is preferably applied.

As used herein, the term "flux" is related to the amount of metal (e.g. cobalt) or metal salt (cobalt salt) passed through the polymer membrane per unit area during a specific period of time.

The term "about" in respect to a measurable unit refers to normal deviations of said measurable unit. It is to be understood that the term "about" can mean a deviation of ±15%, preferably ±10%, more preferably ±5% of the numeric value indicated.

As outlined above, it was found that the cobalt flux is increased when a polymer membrane containing a base polymer, a plasticizer, an extractant and a modifier in specific amounts is applied.

Accordingly, the polymer membrane according to the instant invention comprises about 5.0 to about 33.0 wt.-%, more preferably about 10.0 to about 25.0 wt.-%, still more preferably about 12.0 to about 20.0 wt.-%, like about 13.0 to about 16.0 wt.-% of a base polymer (B), optionally at least about 18.0 wt.-%, more preferably about 18.0 to about 30.0 wt.-%, still more preferably about 20.0 to about 28.0 wt.-%, like about 22.0 to about 26.0 wt.-%, of a plasticizer (P), at least about 22.0 wt.-%, more preferably about 22.0 to about 35.0 wt.-%, still more preferably about 25.0 to about 32.0 wt.-%, like about 29.0 to about 31.0 wt.-%, of an extractant (E), and at least about 26.0 wt.-%, more preferably about 27.0 to about 33.0 wt.-%, still more preferably about 29.0 to about 32.0 wt.-%, of a modifier (M), based on the overall weight of the polymer membrane.

The polymer membrane according to the instant invention may include additives such as antioxidants, UV-stabilizers or softening agents.

Therefore, it is preferred that the polymer membrane according to the instant invention comprises, more preferably consists of, about 5.0 to about 33.0 wt.-%, more preferably about 10.0 to about 25.0 wt.-%, still more preferably about 12.0 to about 20.0 wt.-%, like about 13.0 to about 16.0 wt.-% of a base polymer (B), optionally at least about 18.0 wt.-%, more preferably about 18.0 to about 30.0 wt.-%, still more preferably about 20.0 to about 28.0 wt.-%, like about 22.0 to about 26.0 wt.-%, of a plasticizer (P), at least about 22.0 wt.-%, more preferably about 22.0 to about 35.0 wt.-%, still more preferably about 25.0 to about 32.0 wt.-%, like about 29.0 to about 31.0 wt.-%, of an extractant (E), at least about 26.0 wt.-%, more preferably about 27.0 to about 33.0 wt.-%, still more preferably about 29.0 to about 32.0 wt.-%, of a modifier (M) and 0.0 to about 10.0 wt.-% of additives, based on the overall weight of the polymer membrane.

It is especially preferred that the inventive polymer membrane consists of about 15.0 wt.-% of a base polymer (B), about 25.0 wt.-% of a plasticizer (P), about 30.0 wt.-% of an extractant (E) and about 30 wt.-% of a modifier (M), based on the overall weight of the polymer membrane.

The base polymer (B) for the inventive polymer membrane can be any polymeric material which is permeable for cobalt (II) ions and provides sufficient mechanical strength. Further, the base polymer (B) is hosting the plasticizer (P), the extractant (E) and the modifier (M).

The base polymer (B) is preferably a homopolymer or copolymer of glucose, vinylchloride, ethylene, C2-C10 α-olefins, styrene, acrylnitrile, methylacrylate, methylmethacrylate, aromatic sulfons, butadiene or isoprene, bisphenol, bisphenol A and/or dihalogendiphenylsulfones.

Accordingly, the base polymer (B) is selected from the group consisting of cellulose, cellulose acetate, cellulose triacetate, polyvinylchloride (PVC), polyethylene, polypropylene, polystyrene, polyacrylnitrile, polymethylacrylate, polymethylmethacrylate, polybutadiene, polyisoprene, polysulfone, polyethersulfone or mixtures thereof.

More preferably, the base polymer is selected from cellulose, cellulose acetate, cellulose triacetate and polyvinylchloride (PVC).

It is especially preferred that the base polymer (B) is polyvinylchloride (PVC).

Further, it is preferred that the inventive polymer membrane comprises about 5.0 to about 33.0 wt.-%, more preferably about 10.0 to about 25.0 wt.-%, still more preferably about 12.0 to about 20.0 wt.-%, like about 13.0 to about 16.0 wt.-% of the base polymer (B), based on the overall weight of the polymer membrane. It is especially preferred that the polymer membrane comprises about 15 wt.-% of the base polymer (B).

Further, the polymer membrane according to the instant invention may comprise a plasticizer (P). The addition of plasticizers is a usual practice in the field of polymer materials, especially for polyvinylchloride materials. The plasticizer is applied to adapt the viscosity of the polymer.

Thus, for a polymer membrane, the plasticizer (P) has a major influence on the intermolecular forces between the polymer chains determining the microstructure and, therefore, the permeability of the membrane.

According to the present invention, the plasticizer (P) is an organic compound comprising oxygen-containing functional groups such as ether-, ester- or hydroxyl-groups.

Thus, the plasticizer (P) is selected from the group consisting of 2-nitro-phenyl octyl ether (2-NPOE), 2-nitrophenyl pentyl ether (2-NPPE), diisononyl phthalate (DINP), diisodecyl phthalate (DIDP), di-2-ethylhexyl phthalate (DEHP) and mixtures thereof.

Additionally or alternatively, it is preferred that the plasticizer (P) has a specific dielectric constant $\in$. In particular, it is preferred that the plasticizer (P) is featured by a rather high dielectric constant $\in$. Thus, it is preferred that the plasticizer (P) has a dielectric constant $\in$ of at least 18, more preferably at least 20, still more preferably at least 22, like in the range of 18 to 30.

It is especially preferred that the plasticizer is 2-nitrophenyl pentyl ether (2-NPPE).

Since the plasticizer (P) has an influence on the viscosity of the polymer membrane, the mobility of the cobalt (II) ions is also determined by the overall amount of plasticizer (P) in the polymer membrane.

Thus, it is preferred that the inventive polymer membrane comprises at least at least 18.0 wt.-%, more preferably 18.0 to 30.0 wt.-%, still more preferably 20.0 to 28.0 wt.-%, like 22.0 to 26.0 wt.-%, of the plasticizer (P), based on the overall weight of the polymer membrane. It is especially preferred that the inventive polymer membrane comprises 25.0 wt.-% of the plasticizer (P).

In addition to the base polymer (B) and the plasticizer (P), the inventive polymer membrane further comprises an extractant (E).

The presence of the extractant (E) in the polymer membrane facilitates the transport of cobalt (II) ions through the membrane. Thus, it is preferred that the extractant (E) is an ionic compound that interacts with the ionic cobalt species, but also comprises non-polar moieties in order to improve the solubility of the extractant (E) in the polymeric membrane.

Accordingly, it is preferred that the extractant (E) is a phase transfer catalyst.

In particular, the extractant (E) according to the present invention is preferably a tertiary amine or a quaternary ammonium compound.

Preferably, the extractant (E) is selected from the group consisting of trioctylmethylammonium chloride (Aliquat 336®), tetra-n-butylammonium bromide, tetramethylammonium chloride, dimethyldioctadecylammonium chloride, N,N-dioctyl-1-octanamine (Alamine 336®), Tri-n-octylamine (Alamine 308®) or mixtures thereof.

It is especially preferred that the extractant (E) is trioctylmethylammonium chloride (Aliquat 336®).

As outlined above, the extractant (E) facilitates the transport of cobalt through the polymer membrane. Therefore, the amount of extractant (E) in the polymer membrane has a major influence on the cobalt flux which increases with the amount of extractant (E). However, the viscosity of the polymer membrane is also increased at higher extractant concentrations which, on the other hand, leads to a reduced cobalt flux.

Accordingly, the polymer membrane according to the instant invention comprises at least about 22.0 wt.-%, more preferably about 22.0 to about 35.0 wt.-%, still more preferably about 25.0 to about 32.0 wt.-%, like about 29.0 to about 31.0 wt.-%, of an extractant (E), based on the overall weight of the polymer membrane. It is especially preferred that the polymer membrane comprises about 30 wt.-% of the extractant (E).

The inventive polymer membrane further comprises a modifier (M). The modifier is applied in order to increase the efficiency of the cobalt extraction from the polymer membrane into the stripping solution (S) whereupon the cobalt flux is increased as well by the presence of the modifier (M).

For the inventive polymer membrane, suitable modifiers (M) are aromatic or aliphatic esters of phosphoric acid. In particular, the modifier is selected from the group consisting of triphenylphosphat, tri-n-butylphosphat, tri-sec-butylphosphat, tri-tert-butylphosphat, triethylphosphat, trimethylphosphat, tri-n-propylphosphat, triisopropylphosphat, tri-n-hexylphosphat and mixtures thereof.

According to an especially preferred embodiment of the present invention, the modifier is tri-n-butylphosphat (TBP).

Additionally, it is preferred that the inventive polymer membrane comprises at least about 26.0 wt.-%, more preferably about 27.0 to about 33.0 wt.-%, still more preferably about 29.0 to about 32.0 wt.-%, of the modifier (M), based on the overall weight of the polymer membrane. It is especially preferred that the polymer membrane comprises about 30.0 wt.-% of the modifier (M):

It is preferred that polymer membrane according to the instant invention comprises the base polymer (B) and the extractant (E) in a weight ratio w(B)/w(E) below about 1.3, wherein w(B) is the overall amount of the base polymer (B) in wt.-% and w(E) is the overall amount of the extractant (E) in wt.-%, based on the overall weight of the polymer membrane, respectively.

More preferably, the weight ratio w(B)/w(E) between the base polymer (B) and the extractant (E) is in the range of about 0.1 to below 1.2, still more preferably in the range of about 0.2 to about 0.8, like in the range of about 0.4 to about 0.7. It is especially preferred that the weight ratio w(B)/w(E) is in the range of about 0.1 to about 0.7.

Additionally or alternatively to the previous paragraphs, it is preferred that polymer membrane according to the instant invention comprises the extractant (E) and the plasticizer (P) in a weight ratio w(E)/w(P) below 1.6, wherein w(E) is the overall amount of the extractant (E) in wt.-% and w(P) is the overall amount of the plasticizer (P) in wt.-%, based on the overall weight of the polymer membrane, respectively.

More preferably, the weight ratio w(E)/w(P) between the extractant (E) and the plasticizer (P) is in the range of about 0.5 to below 1.6, still more preferably in the range of about 0.8 to about 1.4, still more preferably in the range of about 1.1 to about 1.3.

According to a particularly preferred embodiment of the present invention, the weight ratio w(B)/w(E) as defined above is in the range of about 0.1 to about 0.7 and the base polymer (B) is polyvinylchloride.

According to another particularly preferred embodiment of the present invention, the weight ratio w(B)/w(E) as defined above is in the range of about 0.1 to about 0.7 and the extractant (E) is selected from a tertiary amine or a quaternary ammonium compound.

It is particularly preferred that the weight ratio w(B)/w(E) as defined above is in the range of about 0.1 to about 0.7 and the extractant (E) is trioctylmethylammonium chloride (Aliquat 336®).

According to another particularly preferred embodiment of the present invention, the weight ratio w(B)/w(E) as defined above is in the range of about 0.1 to about 0.7 and the modifier (M) is selected from an aromatic or aliphatic ester of phosphoric acid.

It is particularly preferred that the weight ratio w(B)/w(E) as defined above is in the range of about 0.1 to about 0.7 and the modifier (M) is tri-n-butylphosphat (TBP).

According to another particularly preferred embodiment of the present invention, the weight ratio w(B)/w(E) as defined above is in the range of about 0.1 to about 0.7, the extractant (E) is selected from a tertiary amine or a quaternary ammonium compound, and the modifier (M) is selected from an aromatic or aliphatic ester of phosphoric acid.

It is particularly preferred that the weight ratio w(B)/w(E) as defined above is in the range of about 0.1 to about 0.7, the extractant (E) is trioctylmethylammonium chloride (Aliquat 336®) and the modifier (M) is tri-n-butylphosphat (TBP).

According to another particularly preferred embodiment of the present invention, the base polymer (B) is polyvinylchloride (PVC), the extractant (E) is selected from a tertiary amine or a quaternary ammonium compound, and the modifier (M) is selected from an aromatic or aliphatic ester of phosphoric acid.

It is particularly preferred that the base polymer (B) is polyvinylchloride (PVC), the extractant (E) is trioctylmethylammonium chloride (Aliquat 336®) and the modifier (M) is tri-n-butylphosphat (TBP).

According to another particularly preferred embodiment of the present invention, the base polymer (B) is polyvinylchloride (PVC), the weight ratio w(B)/w(E) as defined above is in the range of about 0.1 to about 0.7, the extractant (E) is selected from a tertiary amine or a quaternary ammonium compound and the modifier (M) is selected from an aromatic or aliphatic ester of phosphoric acid.

It is particularly preferred that the base polymer (B) is polyvinylchloride (PVC), the weight ratio w(B)/w(E) as defined above is in the range of about 0.1 to about 0.7, the extractant (E) is trioctylmethylammonium chloride (Aliquat 336®) and the modifier (M) is tri-n-butylphosphat (TBP).

It is preferred that the thickness of the inventive polymer membrane is below 25 µm, more preferably below 15 µm, still more preferably below 12 µm.

As outlined above, the present invention is also directed to a method for separating cobalt from other metals.

According to the inventive method, cobalt (II) ions are selectively extracted from a feed solution containing cobalt (II) ions and further metal ions other than cobalt. Said feed solution is fed into a first reactor chamber which is separated from a second reactor chamber by the above described polymer membrane. The cobalt (II) ions are selectively passed through the polymer membrane into the second reactor chamber while the metal ions other than cobalt (II) remain in the first reactor chamber. The second reactor chamber contains a stripping solution (S) which facilitates the extraction of the cobalt (II) ions from the membrane.

As used herein, the term "selectivity" is related to the degree of purity of the cobalt salt obtained by the inventive extraction method. In one embodiment "selective" means that any metals other than cobalt are present in an amount of 5.0 wt %- or less, 3.0 wt-% or less, 1.5 wt-%, 1.0 wt-% or less, 0.5 wt-% or less, 0.2 wt-% or less or 0.1 wt-% or less.

Thus, the inventive method comprises the steps of
a) providing a container comprising a first chamber and a second chamber separated by a polymer membrane as described above,
b) feeding a composition comprising cobalt and/or at least one salt thereof and at least one further metal other than cobalt and/or at least one salt of a further metal other than cobalt into the first chamber, c) adding thiocyanic acid and/or a salt thereof to the composition of step b) in the first chamber, d) optionally adding a pH-buffer to the composition obtained in step c) in the first chamber, and e) feeding a stripping solution (S) into the second chamber.

It is preferred that the at least one cobalt salt according to step b) is a cobalt (II) salt.

In particular, it is preferred that the at least one cobalt salt applied in step b) is selected from cobalt (II) chloride ($CoCl_2$), cobalt (II) bromide ($CoBr_2$), cobalt (II) iodide ($CoI_2$), cobalt (II) fluoride ($CoF_2$), cobalt (II) sulfate ($CoSO_4$), cobalt (II) sulfite ($CoSO_3$), cobalt (II) nitrate ($Co(NO_3)_2$) and mixtures thereof.

More preferably, the at least one cobalt salt is selected from cobalt (II) chloride ($CoCl_2$) and cobalt (II) sulfate ($CoSO_4$).

It is especially preferred that the at least one cobalt salt is cobalt (II) sulfate ($CoSO_4$).

Preferably, the composition of step b) comprises at least 10 ppm, more preferably at least 100 ppm, still more preferably at least 400 ppm of the at least one cobalt salt. It is particularly preferred that the composition of step b) comprises 10 to 10,000 ppm of the at least one cobalt salt.

The composition further comprises at least one other metal or metal salt other than cobalt or a cobalt salt from which the cobalt or cobalt salt is to be separated. It is preferred that the salt of a further metal other than cobalt is a salt of nickel. In particular, said salt of nickel is preferably selected from nickel (II) chloride ($NiCl_2$), nickel (II) bromide ($NiBr_2$), nickel (II) iodide ($NiI_2$), nickel (II) fluoride ($NiF_2$), nickel (II) sulfate ($NiSO_4$), nickel (II) sulfite ($NiSO_3$), nickel (II) nitrate ($Ni(NO_3)_2$) and mixtures thereof.

More preferably, the nickel salt is selected from nickel (II) chloride ($NiCl_2$) and nickel (II) sulfate ($NiSO_4$).

It is especially preferred that the nickel salt is nickel (II) sulfate ($NiSO_4$).

Preferably, the composition of step b) comprises at least 10 ppm, more preferably at least 600 ppm, still more preferably at least 800 ppm of the at least one further metal salt of a metal other than cobalt. It is particularly preferred that the composition of step b) comprises 800 to 1200 ppm of the at least one further metal salt of a metal other than cobalt.

According to a preferred embodiment of the present invention, the composition of step b) comprises cobalt and/or at least one salt thereof and at least one further metal other than cobalt and/or at least one salt of a further metal other than cobalt in a ratio of 1:0.01 and 1:1000, more preferably in a ratio of 1:0.5 to 1:500, still more preferably in a ratio of 1:1 to 1:100, like in a ratio of 1:1.5 to 1:10.

It is preferred that the composition obtained in step b) is an aqueous solution cobalt and/or at least one salt thereof and at least one further metal other than cobalt and/or at least one salt of a further metal other than cobalt.

According to step c) of the inventive method, a thiocyanic acid and/or a salt thereof is added to the composition of step b).

It is preferred that said salt of thiocyanic acid is selected from ammonium thiocyanate ($NH_4SCN$), sodium thiocyanate (NaSCN), potassium thiocyanate (KSCN), calcium thiocyanate ($Ca(SCN)_2$), magnesium thiocyanate ($Mg(SCN)_2$) and mixtures thereof.

It is especially preferred that the salt of thiocyanic acid is ammonium thiocyanate ($NH_4SCN$).

Additionally, it is preferred that the thiocyanic acid and/or a salt thereof is added to the composition of step b) so that the resulting composition obtained in step c) contains thiocyanic acid and/or a salt thereof in a concentration of at least 1.0 mol/L, more preferably at least 1.2 mol/L, still more preferably at least 1.5 mol/L.

The efficiency of the transport of cobalt (II) ions through the polymer membrane is also determined by the pH value of the feed solution.

Therefore, a pH-buffer may be added to the composition obtained after step c) in the first chamber of the reactor.

It is preferred that the pH-buffer is a composition of an organic or inorganic acid and a salt thereof. In particular, the organic or inorganic acid is selected from acetic acid, formic acid, carbonic acid, phosphoric acid, citric acid or mixtures thereof.

It is especially preferred that the pH-buffer is a mixture of acetic acid and ammonium acetate. Preferably, the molar ratio between acetic acid and sodium acetate ranges from about 1:2 to about 2:1.

Preferably, the pH-buffer is added to the composition obtained in step c) to that the pH value of the resulting composition obtained in step d) in the first reactor chamber is in the range of about 2 to about 6, more preferably in the range of about 3 to about 5. It is especially preferred that the pH value in step d) is adjusted to a value of about 4.

According to step e) of the inventive method, a stripping solution (S) is fed into the second chamber of the reactor.

As used herein, the term "stripping solution" is related to a composition applicable for extracting cobalt from the polymer membrane.

Accordingly, the stripping solution (S) is applied to extract the cobalt (II) ions from the polymer membrane into the second reactor chamber.

According to a preferred embodiment of the present invention, the stripping solution (S) contains a compound capable of extracting the cobalt (II) ions from the polymer membrane. It is required that the stripping solution (S) provides a strong complexing compound so that the polymer membrane releases a cobalt (II) ion. Therefore, it is preferred that the stripping solution is a base.

In particular, the stripping solution (S) comprises ammonia ($NH_3$), triethanolamine (TEA), sodium carbonate ($Na_2CO_3$) or mixtures thereof and a solvent.

It is especially preferred that the stripping solution comprises ammonia ($NH_3$) and triethanolamine (TEA). In particular, it is preferred that the stripping solution comprises ammonia ($NH_3$) and triethanolamine (TEA) in a molar ratio in the range of about 1:2 to about 2:1.

Further, it is preferred that the solvent for the stripping solution (S) is selected from water, dichloromethane, chloroform, tetrachloromethane, methanol, ethanol, diethylether, benzene, toluene or mixtures thereof. It is particularly preferred that the solvent is water.

Additionally or alternatively, it is preferred that the stripping solution (S) exhibits a pH of 8 to 14, more preferably of 10 to 14, still more preferably of 10-12.

It is preferred that the stripping solution (S) does not contain more than 50 ppm, more preferably not more than 25 ppm, still more preferably not more than 10 ppm of the at least one further metal other than cobalt and/or at least one salt of a further metal other than cobalt after step e) of the inventive process.

The present invention is further directed to the use of the inventive polymer membrane for the separation of cobalt and/or a salt thereof from a composition comprising at least one further metal other than cobalt and/or at least one salt of a further metal other than cobalt.

In particular, the inventive membrane is used for the separation of cobalt (II) ions from compositions, preferably aqueous compositions, generated in the mining industry such as aqueous ores or pregnant leach solutions. The inventive membrane is further used in the recycling industry in order to re-extract cobalt (II) ions from waste solutions containing cobalt (II) ions.

In this regard, it is preferred that the cobalt or salt thereof obtained after the separation process does not contain more than about 10.0 wt.-%, more preferably not more than about 5.0 wt.-%, still more preferably not more than about 2.0 wt.-% of the at least one further metal other than cobalt and/or at least one salt of a further metal other than cobalt.

It is especially preferred that the at least one further metal salt of a metal other than cobalt is nickel.

The scope and interest of the invention will be better understood based on the following examples which are intended to illustrate certain embodiments of the invention and are non-limitative.

EXAMPLES

The following tests were conducted to determine the selectivity and cobalt flux.
Preparation of the Polymer Membranes The polymer membranes used in the following example comprise the following compounds:
Polyvinylchloride (PVC)
2-nitro phenyl pentyl ether (2-NPPE)
Trioctylmethylammonium chloride (Aliquat 336)
Tributylphosphate (TBP)

For the preparation of polymer membrane M1, 0.28 g of PVC, 0.42 mL of 2-NPPE, 0.63 mL of Aliquat 336 and 0.56 mL of TBP are dissolved in 45 mL THF. 15 mL of the resulting solution are poured into a casting ring and THF is evaporated overnight. The resulting film is peeled off and attached between the two chambers of the test apparatus.

For the preparation of polymer membrane M2, 3.3 g of PVC, 5.5 g of 2-NPPE, 6.6 g of Aliquat 336 and 6.6 g of TBP are dissolved in 60 mL THF. 5 mL of the resulting solution are drawn off with a squeegee and THF is evaporated overnight. The resulting film is peeled off and attached between the two chambers of the test apparatus.
Preparation of the Feed and Strip Solutions The feed solution is obtained by dissolving 13.0 g ammonium thiocyanate in distilled water. Then 0.45 g Ni(II)sulfate hexahydrate and 0.24 g Co(II)sulfate heptahydrate are added. Subsequently, an aqueous ammonium acetate buffer solution is added so that the final volume of the obtained composition is 100 mL. The thus obtained feed solution has a pH of 4.

The strip solution is obtained by dissolving 12.08 g ammoniumhydroxide (28-30%) and 15.22 g triethanolamine in 100 mL distilled water.
Determination of the Cobalt Flux To determine the cobalt flux through the membrane, a test apparatus being a teflon container is applied. Said container is divided into two equal chambers which are separated by the respective polymer membrane M1 or M2. The chambers are equipped with mechanical stirrers.

For the determination of the cobalt flux through polymer membrane M1, 38 mL of feed and 38 mL of strip solution are placed into the respective chambers of the test apparatus and stirred at 600 rpm. After 20 min, 40 min, 1 h, 2 h, and 3 h, 2.0 mL samples of each solution are withdrawn and subjected to atomic emission spectroscopy (ICP-OES) analysis.

Analysis of the concentrations revealed that no nickel could be detected in the strip solution and the cobalt flux J(Co) from the feed solution into the strip solution using polymer membrane M1 was $7.3 \times 10^{-5}$ mol/m$^2$ s.

For the determination of the cobalt flux through polymer membrane M2, 100 mL of feed and 100 mL of strip solution are placed into the respective chambers of the test apparatus and stirred at 600 rpm. After 3 h and 6 h, 10 mL samples of each solutions are withdrawn and subjected to atomic absorption spectroscopy (AAS) analysis.

Analysis of the concentrations revealed that no nickel could be detected in the strip solution and the cobalt flux J(Co) from the feed solution into the strip solution was $2.5 \times 10^{-4}$ mol/m$^2$ s.

The invention claimed is:

1. A polymer membrane, comprising
   i) about 5.0 to about 33.0 wt.-% of a base polymer (B),
   ii) optionally at least about 18 wt.-% of a plasticizer (P),
   iii) at least about 22 wt.-% of an extractant (E), and
   iv) at least about 26 wt.-% of a modifier (M) comprising an aromatic or aliphatic ester of phosphoric acid,
   each based on the overall weight of the polymer membrane,
   comprising the base polymer (B) and the extractant (E) in a weight ratio w(B)/w(E) in the range of 0.1 to 0.7, wherein w(B) is the overall amount of the base polymer (B) in wt.-% and w(E) is the overall amount of the extractant (E) in wt.-%, based on the overall weight of the polymer membrane, respectively.

2. The polymer membrane according to claim 1, wherein the base polymer (B) comprises at least one polymer selected from the group consisting of cellulose, cellulose acetate, cellulose triacetate, polyvinylchloride (PVC), polyethylene, polypropylene, polystyrene, polyacrylonitrile, polymethylacrylate, polymethylmethacrylate, polybutadiene, polyisoprene, polysulfone and polyethersulfone.

3. The polymer membrane according to claim 2, wherein the base polymer (B) comprises polyvinylchloride (PVC).

4. The polymer membrane according to claim 1, wherein the extractant (E) comprises a tertiary amine or a quaternary ammonium compound.

5. The polymer membrane according to claim 1, wherein the base polymer (B) comprises polyvinylchloride (PVC), and wherein the extractant (E) comprises a tertiary amine or a quaternary ammonium compound.

6. The polymer membrane according to claim 1, comprising the plasticizer (P), wherein the polymer membrane comprises the extractant (E) and the plasticizer (P) in a weight ratio w(E)/w(P) below 1.6, wherein w(E) is the overall amount of the extractant (E) in wt.-% and w(P) is the overall amount of the plasticizer (P) in wt.-%, based on the overall weight of the polymer membrane, respectively.

7. The polymer membrane according to claim 1, comprising the plasticizer (P), wherein the plasticizer (P) comprises at least one compound selected from the group consisting of 2-nitro-phenyl octyl ether (2-NPOE), 2-nitrophenyl pentyl ether (2-NPPE), diisononyl phthalate (DINP), diisodecyl phthalate (DIDP), di-2-ethylhexyl phthalate (DEHP), and 1,2-cyclohexanedicarbonacid-diisononylester.

8. The polymer membrane according to claim 1, wherein the extractant (E) comprises at least one compound selected from the group consisting of trioctylmethylammonium chloride (Aliquot 336®), tetra-n-butylammonium bromide, tetramethylammonium chloride, dimethyldioctadecylammonium chloride, N,N-dioctyl-1-octanamine (Alamine 336®), and Tri-n-octylamine (Alamine 308®).

9. The polymer membrane according to claim 1, Wherein the modifier (M) comprises at least one compound selected from the group consisting of triphenylphosphate, tri-n-butylphosphate, tri-sec-butylphosphate, tri-tert-butylphosphate, triethylphosphate, trimethylphosphate, tri-n-propylphosphate, triisopropylphosphate and tri-n-hexylphosphate.

10. A method for separating cobalt from other metals, comprising:
   a) providing a container comprising a first chamber and a second chamber separated by a polymer membrane according to claim 1,
   b) feeding a composition comprising cobalt and/or at least one salt thereof and at least one further metal other than cobalt and/or at least one salt of a further metal other than cobalt into the first chamber,
   c) adding thiocyanic acid and/or a salt thereof to the composition of b) in the first chamber,
   d) optionally adding a pH-buffer to the composition obtained in c) the first chamber, and
   e) feeding a stripping solution (S) into the second chamber.

11. The method according to claim 10, wherein the stripping solution (S) comprises ammonia ($NH_3$) and triethanolamine (TEA) in a molar ratio in the range of about 2:1 to about 1:2.

12. The method according to claim 10, wherein ammonium thiocyanate ($NH_4SCN$) is applied in c).

13. The method according to claim 10, wherein
   i) the pH-buffer comprises acetic acid and ammonium acetate and/or
   ii) the pH value of the composition obtained in d) is in the range of 2 to 6.

14. The method according to claim 10, wherein the cobalt salt comprises at least one compound selected from the group consisting of cobalt (II) chloride ($CoCl_2$), cobalt (II) bromide ($CoBr_2$), cobalt (II) iodide ($CoI_2$), cobalt (II) fluoride ($CoF_2$), cobalt (II) sulfate ($CoSO_4$), cobalt (II) sulfite ($CoSO_3$), and cobalt (II) nitrate ($Co(NO_3)_2$).

15. The method according to claim 10, wherein the at least one salt of a further metal other than cobalt comprises at least one compound selected from the group consisting of nickel (II) chloride ($NiCl_2$), nickel (II) bromide ($NiBr_2$), nickel (II) iodide ($NiI_2$), nickel (II) fluoride ($NiF_2$), nickel (II) sulfate ($NiSO_4$), nickel (II) sulfite ($NiSO_3$), and nickel (II) nitrate ($Ni(NO_3)_2$).

* * * * *

UNITED STATES PATENT AND TRADEMARK OFFICE
CERTIFICATE OF CORRECTION

Page 1 of 1

PATENT NO. : 11,077,408 B2
APPLICATION NO. : 16/470433
DATED : August 3, 2021
INVENTOR(S) : Yoke Lim Lim et al.

It is certified that error appears in the above-identified patent and that said Letters Patent is hereby corrected as shown below:

On the Title Page

Page 2, item [56], Line 20 reads:
"Written Opinion dated Apr. 30, 2018 in PCT/EP2017/084063, dated Dec. 21, 2017",
And should read:
-- Written Opinion dated Apr. 30, 2018 in PCT/EP2017/084063, issued Dec. 21, 2017 --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*